United States Patent [19]
Kohn

[11] Patent Number: 5,536,055
[45] Date of Patent: Jul. 16, 1996

[54] PET LITTER WASTE SCOOP

[76] Inventor: Richard Kohn, 1525 Darien Club Dr., Darien, Ill. 60561

[21] Appl. No.: 471,862

[22] Filed: Jun. 6, 1995

[51] Int. Cl.$^6$ .................................................. A01K 29/00
[52] U.S. Cl. ............................ 294/1.3; 209/418; 294/55
[58] Field of Search ............................. 294/1.3, 1.4, 49, 294/55; 15/257.1–257.7; 119/161, 165; 209/417–419; D7/691, 692; D8/10; D30/161, 162

[56] References Cited

U.S. PATENT DOCUMENTS

| | | | |
|---|---|---|---|
| 71,969 | 12/1867 | Brooks | 294/55 X |
| D. 194,217 | 12/1962 | Bloch | 15/257.1 X |
| D. 209,660 | 12/1967 | Lind . | |
| D. 233,153 | 10/1974 | Lowe . | |
| 240,650 | 4/1881 | Bradford | 209/419 X |
| D. 255,951 | 7/1980 | Halls et al. | 294/1.3 X |
| D. 256,173 | 7/1980 | Rigney . | |
| D. 314,254 | 1/1991 | Gordan . | |
| D. 316,315 | 4/1991 | Elrod . | |
| D. 332,675 | 1/1993 | Simon . | |
| D. 347,497 | 5/1994 | VanSkiver . | |
| 1,085,434 | 1/1914 | Kerr | 209/419 |
| 3,877,742 | 4/1975 | Hatfield . | |
| 3,879,079 | 4/1975 | Nicholas . | |
| 5,186,506 | 2/1993 | Gale . | |
| 5,238,277 | 8/1993 | Robinson . | |
| 5,417,044 | 5/1995 | Russo | 294/55 X |

FOREIGN PATENT DOCUMENTS

| | | | |
|---|---|---|---|
| 134622 | 10/1949 | Australia | 294/55 |
| 658177 | 3/1938 | Germany | 294/55 |
| 234955 | 6/1925 | United Kingdom | 294/55 |

Primary Examiner—Johnny D. Cherry
Attorney, Agent, or Firm—Welsh & Katz, Ltd.

[57] ABSTRACT

A novel device for removing solid animal waste and the like from granular material includes a substantially enclosed receptacle having an opening configured to receive material containing solid animal waste. The receptacle has a plurality of apertures substantially smaller in size than the opening of the receptacle such that the material received by the receptacle passes through the plurality of apertures while the solid animal waste does not pass through the plurality of apertures and is retained within the receptacle. The plurality of apertures is formed from substantially parallel spaced apart elongated channels and the channels are sized to permit the granular pet litter to pass therethrough while trapping fecal matter within the receptacle for subsequent disposal.

16 Claims, 2 Drawing Sheets

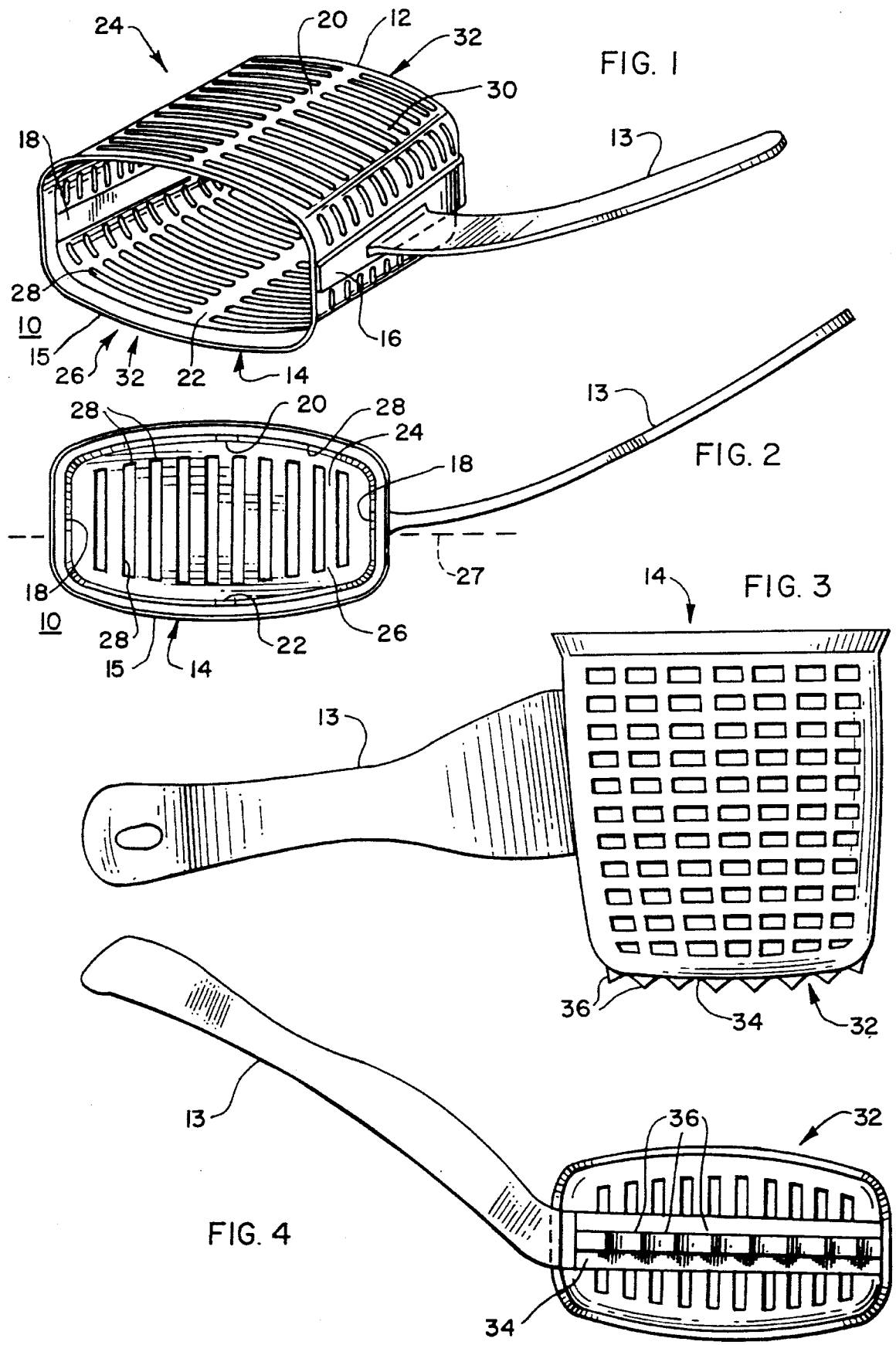

PET LITTER WASTE SCOOP

BACKGROUND OF THE INVENTION

The present invention relates generally to a device for picking-up and removing animal excrement and more specifically, to an improved scoop for removing solid animal waste from pet litter.

The task of removing pet waste materials, such as solid animal waste, from granular materials such as pet litter often involves the use of specialized devices to collect and separate the pet waste from the pet litter. There is a need for a device that may be used to collect and separate pet waste rapidly, with a limited number of physical operations by the user, while minimizing the potential for the pet waste to fall from the collecting device back into the pet litter box.

The use of pet litter or "Kitty Litter" has been known for many years. Recently available pet litter, often referred to as "European style", "scoopable," or "clumpable" pet litter is capable of forming clumps upon contact with moisture, such as urine. As a result, there is a need to separate such clumps of pet litter along with fecal matter from the non-soiled pet litter present in a pet litter box.

The disagreeable task performed by the pet owner of separating pet waste from non-soiled pet litter may involve extensive sifting and searching through the pet litter to discover fecal matter covered by the pet. Currently available scoops for pet litter separation typically require extensive and repetitive searching for pet waste materials in the pet litter. Such devices typically have large, horizontally deposed surfaces upon which pet litter may be placed during searching operations. These known scoops are often shovel-shaped and typically require the user to repeatedly shake the scoop after lifting the scoop from the pet litter. This causes the unsoiled pet litter to be sifted through the scoop back into the pet litter box, leaving the pet waste materials on the upper surface of the scoop.

To prevent pet waste materials from falling back into the pet litter box during sifting, these devices may be provided with walls along the sides and rear portion. Although these walls may help in the sifting activity, the pet waste is frequently sifted off the device back into the pet litter box.

Known pet litter scoops are typically cumbersome to use since care must be taken when shaking the scoop that materials, such as the pet litter or fecal matter, are not inadvertently shaken from the scoop back into the pet litter box. The more vigorously the scoop is shaken, the quicker the material may be sifted. However, vigorous shaking to effect separation may cause recontamination of the pet litter box, thus creating more work for the user. The presence of any pet waste material on the scoop also precludes the ability to use the scoop to further search the pet litter box for more waste. Pet waste materials collected on the surface of the scoop must be disposed of prior to being able to use the device again to search for more pet waste. This prevents the already scooped pet waste from falling from the scoop, back into the pet litter box upon subsequent searches for further pet waste within the pet litter box.

Accordingly, it is an object of the present invention to substantially overcome all of the above problems.

It is another object of the present invention to provide a novel pet litter waste scoop capable of separating pet waste materials from pet litter in a short period of time.

It is a further object of the present invention to provide a novel pet litter waste scoop capable of separating pet waste materials from clumpable pet litter without substantial searching and in a minimum number of operations.

It is yet another object of the present invention to provide a novel pet litter waste scoop that is inexpensive to produce.

It is still an object of the present invention to provide a novel pet litter waste scoop that may be shaken vigorously to effect separation while minimizing the loss of pet waste materials back into pet litter box.

It is still a further object of the present invention to provide a novel pet litter scoop that allows multiple searches of the pet litter to collect further pet waste without loss of pet waste already collected.

SUMMARY OF THE INVENTION

The disadvantages of known pet litter scoops are substantially overcome with the present invention by providing a novel pet litter waste scoop that may be shaken vigorously to effect separation of fecal matter from pet litter while minimizing the loss of pet waste materials back into the pet litter box area. An improved pet litter waste scoop includes a handle so that the user may draw the scoop through the pet litter with a minimum of effort while avoiding contact with the pet litter and fecal matter. The sides and bottom of the scoop are closed so that only a single opening exists for receiving the pet litter material. Since only a single open end exists, the scoop may be shaken in three perpendicular directions without inadvertent spillage of the pet waste, thus facilitating more rapid and complete separation of pet litter from pet waste. Additionally, multiple searches of the pet litter to collect further pet waste are performed without loss of pet waste already collected.

More specifically, the novel device for removing solid animal waste and the like from granular material includes a substantially enclosed receptacle having an opening configured to receive the material containing the solid animal waste. The receptacle has a plurality of apertures substantially smaller in size than the opening of the receptacle such that the granular material received by the receptacle passes through the plurality of apertures while the solid animal waste does not pass through the plurality of apertures and is retained within the receptacle. The plurality of apertures is formed from substantially parallel spaced apart elongated channels and the channels are sized to permit the granular pet litter to pass therethrough while retaining fecal and waste matter within the receptacle.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

FIG. 1 is a perspective view of one embodiment of the present invention;

FIG. 2 is a front view of one embodiment of the present invention depicting placement of transverse support ribs;

FIG. 3A is a side elevational view of one embodiment of the present invention;

FIG. 3B is a bottom view of one embodiment of the present invention; and

FIGS. 4–6 are perspective views of alternate embodiments of the present invention.

DETAILED DESCRIPTION OF THE INVENTION

Figure 5:
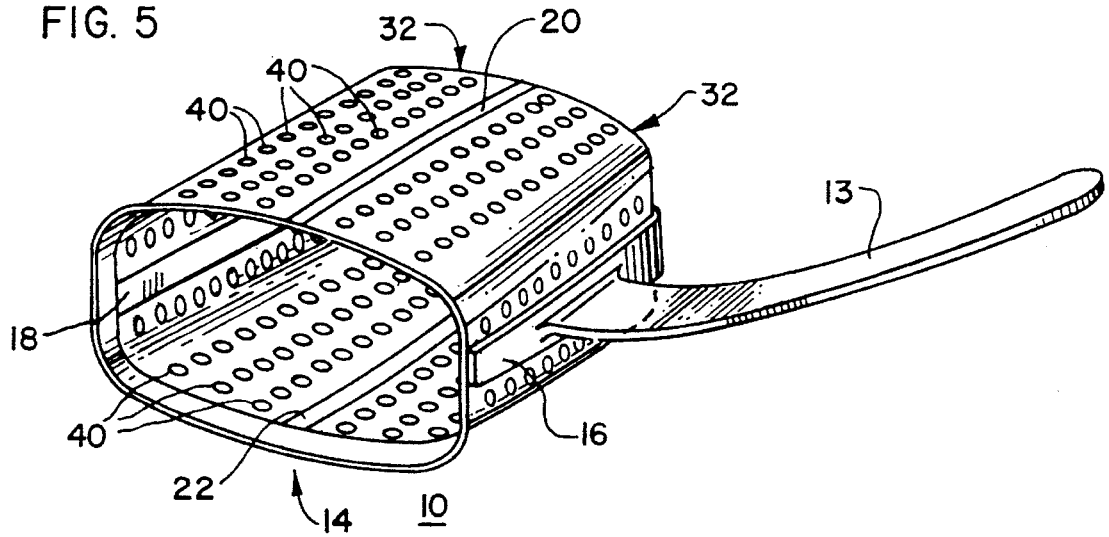

Referring now to FIGS. 1–3B, a specific embodiment of a novel pet litter waste scoop 10 is shown generally. The pet litter waste scoop 10 includes a substantially enclosed receptacle 12 and a handle 13 attached thereto. The handle 13 may be elongated and extend away from the receptacle 12 or may be "U-shaped". Any suitably shaped handle 13 may be used to provide the user with a convenient and ergonomic method for moving the receptacle 12 through the pet litter.

The receptacle 12 and handle 13 may be formed from plastic or metal or any other suitable material as is known in the art. For example, the receptacle 12 and the handle 13 may be formed from polycarbonate, polypropylene, polyvinylchloride, polyethylene and the like using casting or injection molding techniques. Alternately, the receptacle 12 may be formed from metal such as aluminum, steel, iron, copper, zinc, brass and the like. Use of such materials and manufacturing techniques allow for inexpensive mass production. Alternatively, the receptacle 12 and the handle 13 may be formed from metal, such as aluminum or steel and the like.

The receptacle 12 is substantially enclosed and has a relatively wide opening 14 at one end while the other end is closed. Although a single opening 14 is shown, multiple openings may be provided by dividing the area defined by the opening with barriers or ribs (not shown). Thus, the opening 14 may, for example, include two or more individual openings capable of receiving the pet litter and animal waste. The opening 14 is generally oval in cross section and may have a substantially flat bottom portion 15 to maximize the degree of contact between the receptacle 12 and the pet litter when the pet litter scoop 10 is moved along the flat bottom of the pet litter box. Alternately, the receptacle may have a substantially rectangular or hemispherical shape and is not limited to the shape illustrated in the drawings.

Transverse support ribs 16, 18, 20 and 22 extending along the length of the receptacle 12 at substantially right angles to the handle 13 provide structural integrity for the receptacle 12. The support ribs are referred to as first support rib 16, second support rib 18, third support rib 20 and fourth support rib 22. For purposes of illustration, the handle 13 may attach to the first support rib 16. However, the handle 13 may be attached to any of the support ribs 16, 18, 20 and 22.

An imaginary plane defined to extend between the first 16 and second 18 support ribs separates the receptacle 12 into an upper portion 24 and a lower portion 26 and is shown by a dashed line 27 (FIG. 2). The third support rib 20 disposed along the midsection of the upper portion 24 and the fourth support rib 22 disposed along the midsection of the lower portion 26 provide additional structural support. It will be appreciated that the number of transverse support ribs 16, 18, 20 and 22 need not be equal to four. For example, two support ribs may be used if the material from which the receptacle 12 is constructed is sufficiently rigid. Alternatively, the upper portion 24 and the lower portion 26 of the receptacle 12 may each have three transverse support ribs for a total of six support ribs. However, any suitable number may be used. The traverse supports 16, 18, 20 and 22 may be eliminated if the material from which the receptacle 12 is constructed is sufficiently rigid to be formed as a rigid shell.

A plurality of connecting ribs 28 attached between adjacent traverse support ribs 16, 18, 20 and 22 and generally perpendicular thereto form a series of spaces 30 between the connecting ribs while increasing the structural integrity of the receptacle 12. The connecting ribs 28 are substantially parallel spaced apart elongated ribs forming parallel channels 30 therebetween. The distance between adjacent connecting ribs 28 is smaller than the expected size of the clumped pet litter and fecal matter. This distance is also substantially smaller than the diameter of the opening 14. Thus, clumped pet litter and fecal matter retained within the receptacle 12 cannot pass through the channels 30 formed between the connecting ribs 28, and remain within the receptacle for appropriate disposal while clean litter passes through the ribs 28.

A bottom portion 32 of the receptacle 12 includes the plurality of connecting ribs 28 extending in spaced relation between the upper portion 24 and the lower portion 26, with the spaces 30 formed between the connecting ribs. The spacing between the ribs 28 of the bottom portion 32 is less than the expected size of clumped fecal matter and pet litter, whereby loose pet litter falls from receptacle 12 when the receptacle is raised to the position shown in FIG. 3A, while clumped fecal matter and pet litter remain inside receptacle 12. Shaking the receptacle 12 over the litter box allows most, if not all, of the loose litter to fall back into the box, allowing the fecal matter and clumped litter to be removed and properly discarded.

As shown in FIG. 3B, the bottom portion 32 of the receptacle 12 includes a wide central rib 34 from which a plurality of protuberances or dimples 36 extend. These protuberances 36 are used to spread the litter evenly in the box by passing the bottom portion 32 of the receptacle 12 through the litter once the clumped pet litter and fecal matter have been removed from the litter box. Essentially, the scoop 10 may be used as a rake.

Referring now to FIG. 4, an alternate embodiment is shown. Identical reference numerals denoting like structures are used throughout the figures. In this illustrated embodiment, the receptacle 12 may be formed from a shell of material having a plurality of apertures 40. Similar to the channels 30 shown in FIG. 2, the apertures 40 are configured to be smaller in size than the expected size of the clumped pet litter and fecal matter. Thus, clumped pet litter and fecal matter retained within the receptacle 12 cannot pass through the apertures 40 and remain within the receptacle for appropriate disposal. The apertures 40 may be any suitable shape or combination of shapes. For example, the apertures 40 may be circular, oval, rectangular or polygonal in shape. The traverse support ribs 16, 18, 20 and 22 may be eliminated if the material from which the receptacle is formed is sufficiently rigid.

Referring now to FIG. 5, another alternate embodiment is illustrated. A mesh screen 42 supported by the support ribs 16, 18, 20 and 22 may be used. In this embodiment, the support ribs 16, 18, 20 and 22 provide the majority of structural support for the receptacle 12. The openings of the mesh screen 42 are appropriately sized to be smaller than the expected size of the clumped pet litter and fecal matter. Thus, clumped pet litter and fecal matter retained within the receptacle 12 cannot pass through the mesh screen 42 and remain within the receptacle for appropriate disposal.

Figure 6:
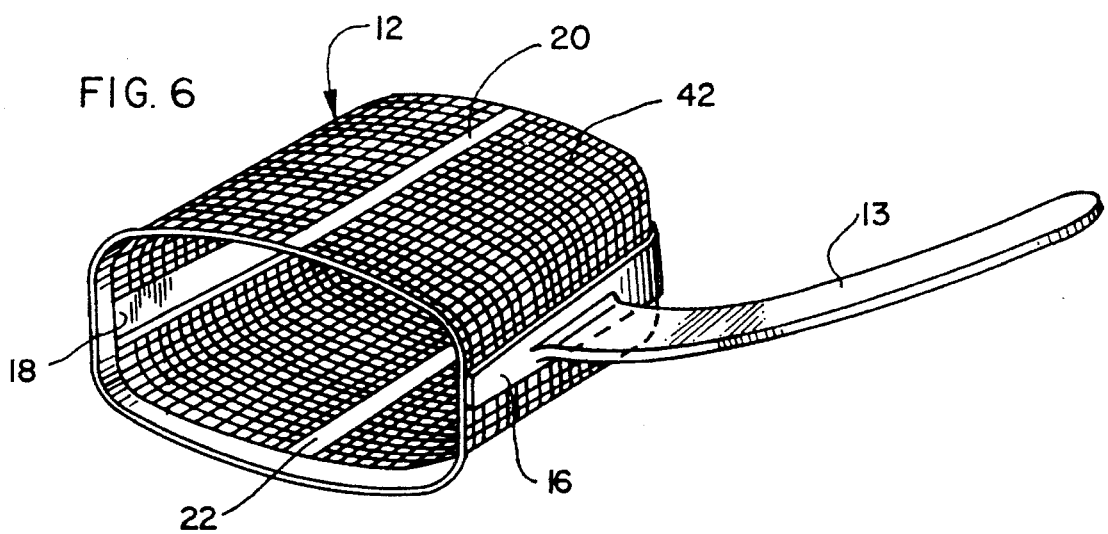
Figure 7:
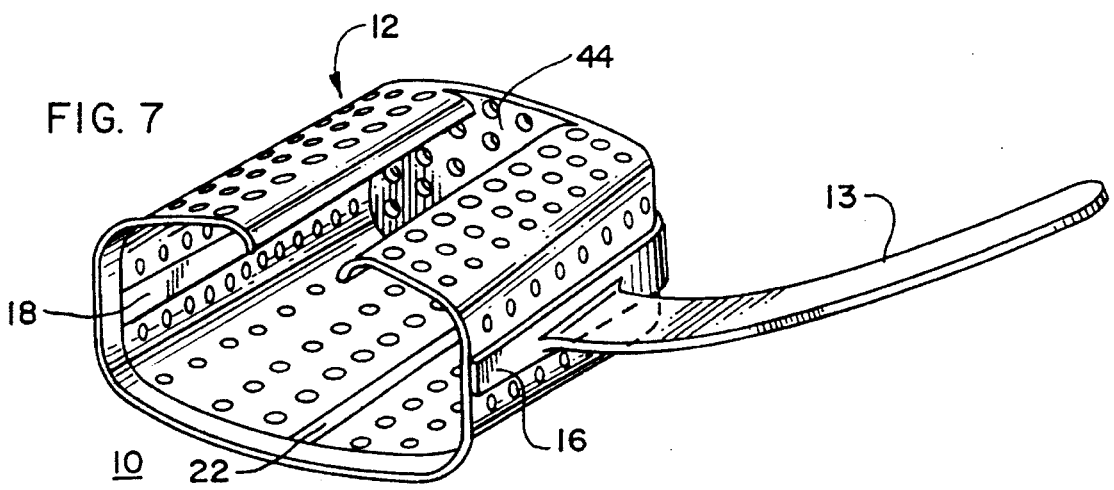

Referring now to FIG. 6, a further alternate embodiment is shown. The receptacle 12 need not be fully enclosed and may be partially open on a top portion 44. Support ribs may be added to provide the necessary structural support. The receptacle 12 shown in this alternate embodiment may be formed according to any of the above-described embodiments. For example, the receptacle 12 may have transverse support ribs 16, 18, 20 and 22 and connecting ribs (not shown), or may be formed from a shell having a plurality of apertures or may be formed from a mesh screen.

Referring back to FIGS. 1–3B, in operation, the user holds the pet litter scoop 10 by the handle 13 and places the receptacle 12 in the pet litter contained in the pet litter box. The user then moves the scoop 10 through the pet litter to maximize the volume of pet litter entering the opening 14 of the receptacle 12. Once a quantity of pet litter has filled a portion of the receptacle 12, the user rotates the scoop 10 upwards so that the opening 14 faces away from the bottom of the pet litter box. The user may then shake the scoop 10 from side to side or up and down to effect separation of pet waste from unsoiled pet litter. Since all sides of the receptacle 12 have channels or apertures 30, the pet litter may exit the receptacle from multiple sides. The user may perform multiple sweeps of the pet litter to collect further pet waste without loss of pet waste already collected, since all pet waste collected remains within the scoop.

With the opening 14 of the receptacle positioned upward and away from the pet litter box, vigorous shaking causes the unsoiled pet litter to sift through the channels or apertures 30 without causing material to inadvertently spill from the opening 14. When all of the unsoiled pet litter has sifted through the receptacle 12, the pet waste is then properly disposed.

Due to the relative dimensions of the connecting ribs 28, the channels 30 formed between adjacent connecting ribs, and the cross-sectional shape of the opening 14, essentially all unsoiled pet litter sifts through the channels or apertures 30 while pet waste material and clumped pet litter remain within the receptacle. Such separation is accomplished quickly since the scoop 10 may be vigorously shaken without inadvertent spillage of waste material.

A specific embodiment of the novel pet litter waste scoop according to the present invention has been described for the purpose of illustrating the manner in which the invention may be made and used. It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

What is claimed is:

1. A device for removing solid animal waste and the like from granular material comprising:

a substantially enclosed receptacle;

the receptacle having an opening at a lateral end thereof configured to receive the granular material containing the solid animal waste; and the receptacle having a plurality of sides, each of said sides having a plurality of apertures substantially smaller in size than the opening of the receptacle such that the granular material received by the receptacle passes through the plurality of apertures while the solid animal waste does not pass through the plurality of apertures and is retained within the receptacle, each said side configured to permit the granular material to pass therethrough.

2. The device according to claim 1 further including a handle attached to a portion of the receptacle.

3. The device according to claim 1 wherein the plurality of apertures are a plurality of substantially parallel spaced apart elongated channels.

4. The device according to claim 1 wherein the plurality of apertures are substantially circular in shape.

5. The device according to claim 1 wherein the plurality of apertures are substantially polygonal in shape.

6. The device according to claim 1 wherein the plurality of apertures are of a shape selected from the group consisting of circles, ovals, slots, channels, rectangles, and polygons.

7. The device according to claim 1 wherein the receptacle is substantially cylindrical in shape and is open at one end.

8. The device according to claim 1 wherein the receptacle is substantially hemispherical in shape and is open at one end.

9. The device according to claim 1 wherein the receptacle is substantially rectangular in shape and is open at one end.

10. The device according to claim 1 wherein the receptacle is formed from material of the group consisting of polycarbonate, polyethylene, polypropylene and polyvinylchloride.

11. The device according to claim 1 wherein the receptacle is formed from material of the group consisting of aluminum, steel, iron, copper, zinc and brass.

12. The device according to claim 1 wherein the opening of the receptacle is substantially oval in shape.

13. The device according to claim 1 wherein the opening of the receptacle has a substantially flat bottom portion.

14. The device of claim 1 further including a plurality of protruding elements extending from an underside surface of the receptacle to spread the granular material.

15. The apparatus of claim 14 wherein said plurality of protruding elements includes a plurality of pointed probes extending along said underside surface of the receptacle.

16. A device for removing solid animal waste and the like from granular material comprising:

a substantially enclosed receptacle;

the receptacle having an opening at a lateral end thereof configured to receive the granular material containing the solid animal waste; and the receptacle having a plurality of sides, each of said sides having a plurality of apertures substantially smaller in size than the opening of the receptacle such that the granular material received by the receptacle passes through the plurality of apertures while the solid animal waste does not pass through the plurality of apertures and is retained within the receptacle, each said side configured to permit the granular material to pass therethrough; and said receptacle having a bottom portion including a plurality of protruding probe-like elements extending therefrom, said elements configured to spread the granular material.

\* \* \* \* \*